US012592477B2

(12) United States Patent
Güllner et al.

(10) Patent No.: US 12,592,477 B2
(45) Date of Patent: Mar. 31, 2026

(54) ANTENNA, ANTENNA ARRAY AND MOBILE COMMUNICATION BASE STATION

(71) Applicant: Telefonaktiebolaget LM Ericsson (publ), Stockholm (SE)

(72) Inventors: Martin Güllner, Stephanskirchen (DE); Maximilian Obermayer, Rosenheim (DE); Andreas Vollmer, Rosenheim (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 192 days.

(21) Appl. No.: 18/285,415

(22) PCT Filed: Apr. 20, 2021

(86) PCT No.: PCT/EP2021/060247
§ 371 (c)(1),
(2) Date: Oct. 3, 2023

(87) PCT Pub. No.: WO2022/223102
PCT Pub. Date: Oct. 27, 2022

(65) Prior Publication Data
US 2024/0186683 A1 Jun. 6, 2024

(51) Int. Cl.
*H01Q 1/24* (2006.01)
*H01Q 1/48* (2006.01)
(Continued)

(52) U.S. Cl.
CPC ............... *H01Q 1/246* (2013.01); *H01Q 1/48* (2013.01); *H01Q 19/104* (2013.01); *H01Q 21/24* (2013.01)

(58) Field of Classification Search
CPC ......... H01Q 21/24; H01Q 21/26; H01Q 1/246
See application file for complete search history.

(56) References Cited

U.S. PATENT DOCUMENTS 9,899,250 B2 2/2018 Val
2016/0204073 A1 7/2016 Beak et al.
(Continued)

FOREIGN PATENT DOCUMENTS

CN 111355016 A * 6/2020 ............. H01Q 1/526
CN 210926349 U 7/2020
(Continued)

OTHER PUBLICATIONS

Author Unknown, "Metal Laser Sinting / 3D Printing in Filter Development," Walter/FEM, Oct. 16, 2015, Kathrein, 17 pages.
(Continued)

*Primary Examiner* — Daniel Munoz
(74) *Attorney, Agent, or Firm* — Withrow & Terranova, PLLC

(57) ABSTRACT

An antenna has a base body and a metallic conductive structure applied to the base body, wherein the base body comprises a flat cover portion and walls extending perpendicularly away from the cover portion. The conductive structure has at least one radiator provided at the cover portion, at least one feeding line for the at least one radiator and at least one ground portion, wherein the feeding line and the ground portion are provided at at least one of the walls. The radiator defines a radiator plane (R) and the feeding lines extend in at least one feeding plane (F), wherein the at least one feeding plane (F) is arranged perpendicularly to the radiator plane (R). Further, an antenna array and a mobile communication base station are shown.

21 Claims, 7 Drawing Sheets

(51) Int. Cl.
*H01Q 19/10* (2006.01)
*H01Q 21/24* (2006.01)

(56) References Cited

U.S. PATENT DOCUMENTS

| | | | | |
|---|---|---|---|---|
| 2020/0227310 | A1 | 7/2020 | Chen | |
| 2022/0013884 | A1 * | 1/2022 | Zhao | H01Q 9/0457 |

FOREIGN PATENT DOCUMENTS

| | | | | |
|---|---|---|---|---|
| CN | 211126032 | U | 7/2020 | |
| EP | 3624262 | A1 | 3/2020 | |
| WO | WO-2019143211 | A1 * | 7/2019 | H01Q 1/38 |
| WO | 2020091897 | A1 | 5/2020 | |
| WO | 2020135537 | A1 | 7/2020 | |

OTHER PUBLICATIONS

International Search Report and Written Opinion for International Patent Application No. PCT/EP2021/060247, mailed Jan. 28, 2022, 11 pages.

* cited by examiner

ANTENNA, ANTENNA ARRAY AND MOBILE COMMUNICATION BASE STATION

This application is a 35 U.S.C. § 371 national phase filing of International Application No. PCT/EP2021/060247, filed Apr. 20, 2021, the disclosure of which is incorporated herein by reference in its entirety.

TECHNICAL FIELD

The invention relates to an antenna, in particular a radio frequency mobile communication antenna, an antenna array as well as a mobile communication base station.

BACKGROUND

The requirements of radio frequency mobile communication antennas develop towards small antennas with an increasing number of radiators. At the same time, antennas shall be produced cost efficiently.

Small and compact antennas with a plurality of radiators are known for example from CN111355016A. To achieve the compact design, the distribution networks, i.e. the feeding lines for the radiators, are arranged vertically. Such a design, however, requires many components that need to be assembled, which increases cost.

It is known to produce cost-efficient, large-scale antenna arrays using molded interconnected devices (MID), for example from CN210926349U and WO 2020/135537 A1. Such antennas are, however, not compact in size.

SUMMARY

It is therefore an object of the invention to provide an antenna, an antenna array and a mobile communication base station which are small in size, comprising a plurality of radiators and have low manufacturing costs.

For this purpose, an antenna, in particular a radio frequency mobile communication antenna is provided. The antenna comprises a base body and a metallic conductive structure applied to the base body, wherein the base body comprises a flat cover portion and walls extending in an angle, in particular perpendicularly, away from the cover portion. The conductive structure comprises at least one radiator provided at the cover portion, at least one feeding line for the at least one radiator and at least one ground portion, wherein the feeding line and the ground portion are provided at at least one of the walls. The radiator defines a radiator plane and the feeding lines extend in at least one feeding plane, wherein the at least one feeding plane is arranged in an angle, in particular perpendicularly, to the radiator plane.

The underlying realization of the invention is that it is possible to provide a distribution network, i.e. feeding lines, vertically on the walls of the base body by providing the walls at least partly with the ground portion of the metallic conductor structure. By doing so, the radiator feeding- and combining-network are in particular not in the radiator plane and the size of the antenna can be reduced significantly without increasing the number of parts as the walls of the base body support the distribution network so that no further components are necessary.

The antenna may be a radio frequency mobile communication antenna configured to be used for electromagnetic radiation having frequencies between 0.5 GHz and 10 GHz, in particular between 1.7 GHZ and 4.2 GHz and/or 5.9 GHz and 8.4 GHz. The antenna may be used for a mobile communication base station.

The base body is in particular a single piece base body. The walls and the cover portion together may form a single piece.

The base body is, for example, made from a plastic material, in particular formed by injection molding. The plastic material may be made suitable for printing, Laser Direct Structuring (LDS) or Plating On Plastics (POP) techniques.

The ground portion may include shielding segments, wherein the shielding segments are provided at at least one of the sidewalls, in particular along the periphery of the base body. This way, the signal quality of the antenna is increased.

In an embodiment, the walls comprise a first surface and an opposite second surface, wherein the feeding line is located on the first surface and the ground portion is provided on the second surface, in particular the ground portion is located at least in areas on the second surface corresponding to areas occupied by the feeding line on the first surface, leading to a very simple and efficient design.

For a very reliable transmission, the at least one feeding line and the corresponding section of the ground portion together may form at least one microstrip line supported by the walls.

In an aspect of the invention, the radiator is provided on the surface of the cover portion facing away from the walls and/or on the surface of the cover portion facing to the walls, in particular wherein the cover portion comprises holes, wherein the feeding line extends through at least one of the holes, further improving radiation characteristics of the antenna.

In order to increase robustness, the walls may include at least one sidewall extending from the cover portion at periphery of the cover portion, in particular wherein the surface of the sidewall facing towards the cover portion is the first surface and the surface of the sidewall facing away from the cover portion is the second surface.

The sidewalls may be connected forming a frame along the full periphery of the base body and defining an interior volume. The first surfaces may be on the inner side of the sidewalls.

In an embodiment, the walls include interior walls extending at least in parts from the cover portion in the region of one of the at least one radiator. Using interior walls, the feeding lines can be placed flexibly.

For example, at least one of the interior walls is connected to one of the sidewall, wherein the height of the interior wall at the connection to the sidewall is smaller than the height of the sidewalls and/or wherein the sidewall has an opening such that the second surface of the interior wall merges into the second surface of the sidewall. By connecting the interior wall and one of the sidewalls the feeding lines can be arranged in a feeding plane throughout their length.

Further, the reduced height of the interior wall allows for illuminating the sidewall with a laser so that the feeding lines can be applied precisely on the sidewall with LDS techniques.

For avoiding interference between the radiator and the signal line, the interior wall and the corresponding sidewall enclose an angle between 0° and 90°, in particular between 10° and 80° between each other.

In another aspect of the inversion, the cover portion comprises holes associated with one of the interior walls, wherein one of the holes is aligned with one surface of the associated wall and another one of the holes is aligned with the other one of the surfaces of the associated interior wall, allowing a simple way of connecting the radiators to the feeding lines.

For example, the radiator is a dual polarized radiator comprising four radiation surfaces, in particular wherein the radiation surfaces are aligned around a center of the radiator. Using dual polarized radiators decreases the size of the antenna further.

For further reducing interference, the interior wall may run in a polarization plane of the radiator and/or inclined with respect to a slit between adjacent radiation surfaces of the radiator.

In an embodiment, each radiation surface comprises a feeding point and/or a grounding point, in particular wherein the feeding point and/or the grounding point is located at the side of the radiation surface facing the center. This simplifies the contacting of the radiation surfaces.

The other sides of the radiation surface are in particular free from feeding points or grounding points.

For ease of connection, each feeding point and/or grounding point is associated with a hole in the cover portion.

In an embodiment, the antenna comprises a reflector plate extending in a plane parallel to the radiator plane, wherein the reflector plate is attached to the walls on the side facing away from the cover portion, in particular wherein the reflector plate is in contact with the ground portion of the conductive structure. Using a reflector plate leads to a simple construction.

The contact between the ground portion and the reflector plate is galvanic or capacitive.

The reflector plate may be a metal sheet, e.g. single piece aluminum, or made of metalized PCB.

The number of grounding contacts is, for example, larger than the number of input connections of the signal lines.

The sidewalls, the cover portion and the reflector plate may define an interior volume, wherein the feeding lines are provided mainly, in particular fully within the interior volume.

In an aspect of the invention, at least one fixation element, in particular a hot melting button or a metallized pin, is provided at the base body, the fixation element extending through corresponding holes in the reflector plate for attaching the reflector plate to the base body. The fixation element provides a simple means for attachment.

The fixation element may be an integral part of the base body and deformed to fix the reflector plate.

In a further embodiment, the antenna comprises a feeding module being arranged on the side of the reflector plate facing away from the base body, in particular wherein the at least one fixation element extends through corresponding holes in the feeding module for attaching the feeding module to the base body. Integrating a feeding module on the backside of the reflector plate further decreases the size of the antenna.

The fixation element may attach the reflector plate and the feeding module to the base body.

For example, the feeding module comprises at least one feeding circuit or structure, in particular wherein the feeding module comprises a molded interconnected device, leading to a more compact design. The realization as a compact molded interconnected device (MID) made of single piece requires a unique base body form.

For providing a simple input connection, at least one of the walls, in particular a side wall, may comprise a flap extending away from the cover portion, wherein a part of the feeding line extends on the first surface of the flap and/or wherein the ground portion extends on the second side of the flap, in particular wherein the flap has a height larger than the thickness of the reflector plate.

The flap may be seen as a connector. In particular, the flap extends into the feeding module.

In order to reduce the complexity further, the base body and the conductive structure form a single piece, in particular a molded interconnect device, and/or wherein the metallic conductive structure has been metallized directly onto the base body, in particular using printing, Laser Direct Structuring or Plating On Plastics techniques.

In an aspect, the antenna comprises two, three, four or more radiators, in particular wherein at least one feeding line for each radiator is provided, the feeding lines for the same polarization but different radiators being galvanically connected to each other. This way, the number of components of an antenna array may be reduced further.

In this case, the flap may serve as a common input for all radiators.

For above purpose, an antenna array is further provided comprising at least two, for example four, antennas as described above, in particular the antenna array comprises a common reflector plate serving as the reflector plate for each of the antennas.

The features and advantages discussed with respect to the antenna array also apply to the antenna array and vice versa.

In particular, the antennas are attached to the common reflector.

Further, for above purpose, a mobile communication base station is provided having an antenna as described above and/or an antenna array as described above.

The features and advantages discussed with respect to the antenna and/or the antenna array also apply to the mobile communication base station and vice versa.

BRIEF DESCRIPTION OF THE DRAWINGS

Further features and advantages will be apparent from the following description as well as the accompanying drawings, to which reference is made. The drawings show in detail.

DETAILED DESCRIPTION

Figure 1:
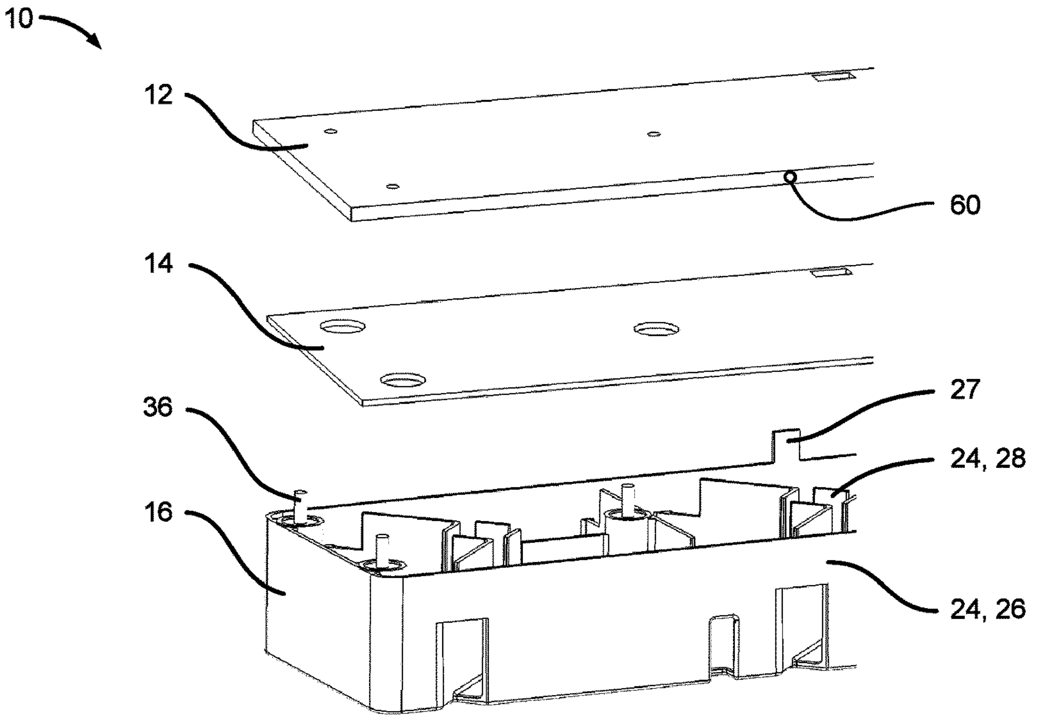
FIG. 1: an exploded view of an antenna according to the invention.

FIG. 1 shows an antenna 10 schematically in an exploded view. The antenna 10 may be a radio frequency mobile communication antenna configured to be used for electromagnetic radiation having frequencies between 0.5 GHz and 10 GHz, in particular between 1.7 GHZ and 4.2 GHz and/or 5.9 GHz and 8.4 GHz.

The antenna 10 is, for example, a radio frequency mobile communication antenna used in mobile communication base stations. In particular, the radio frequency mobile communication antenna 10 is not an antenna used for radar applications.

Figure 2A:
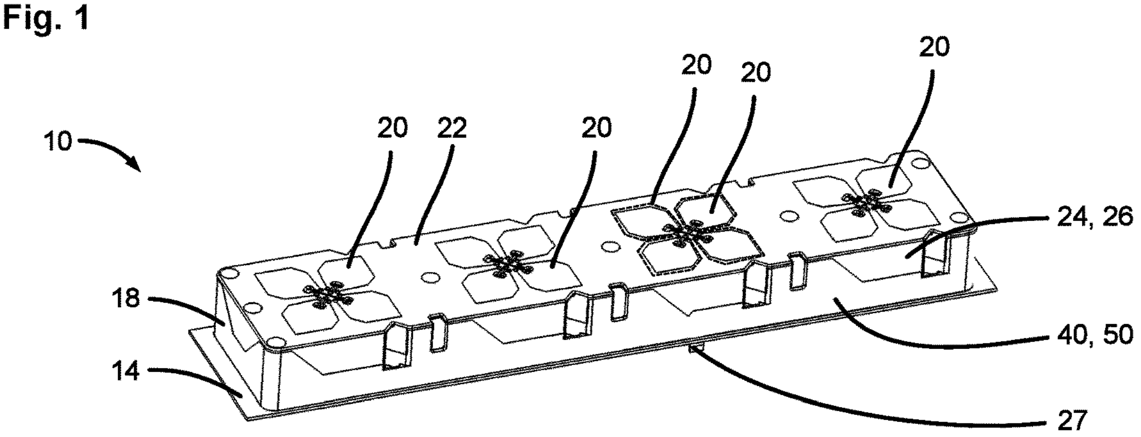
FIGS. 2A, 2B: the antenna according to FIG. 1 without feeding module in a top view and bottom view, respectively.

The antenna 10 comprises a feeding module 12, a reflector plate 14 and a base body 16 with a metallic conductive structure 18 having four radiators 20 (FIG. 2A).

The reflector plate 14 and the feeding module 12 are attached to the same side of the base body 16, wherein the reflector plate 14 is positioned between the feeding module 12 and the base body 16.

Figure 2B:
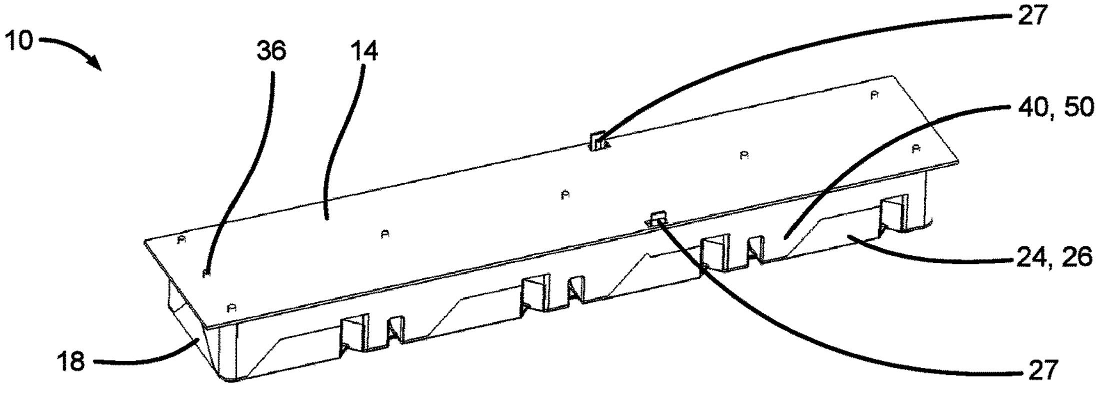

FIG. 2A shows the base body 16 with the attached reflector plate 14 in a perspective top view. The feeding module 12 has been omitted for clarity. Likewise, FIG. 2B shows the base body 16 and the reflector plate 14 in a perspective bottom view.

The radiators 20 are arranged on the surface of the base body 16 facing away from the reflector plate 14 and/or facing to the reflector plate 14 (indicated exemplarily with the dashed lines in FIG. 2A). The base body 16 and thus the antenna 10 have a cuboid shape, wherein the radiators 20 are arranged on a straight in the same plane, called radiator plane R in the following. Each radiator 20 has a center C, around which the radiator 20 is centered.

The base body 16 with the metallic conductive structure 18 is a molded interconnected device (MID). Thus, the base body 16 is made from a single piece of plastics material.

Figure 3:
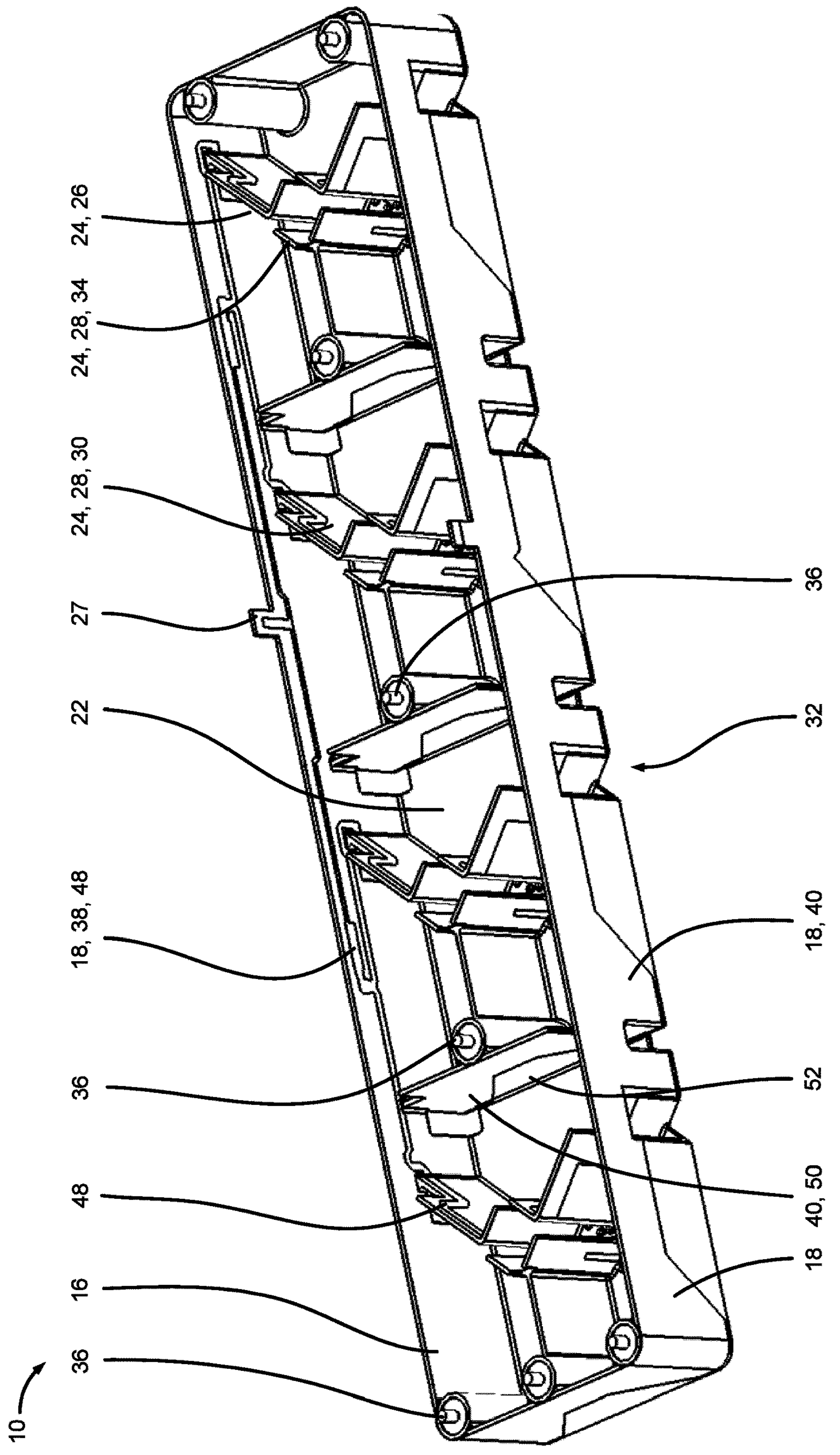
FIG. 3: the base body with the metallic conductive structure of the antenna according to FIG. 1, FIG. 4: the base body of the antenna according to FIG. 1, FIG. 5: the metallic conductive structure of the antenna according to FIG. 1, FIGS. 6, 7: respectively the feeding lines and the ground portion of the conductive structure according to FIG. 5, FIG. 8: an enlarged view of part of a radiator of the antenna according to FIG. 1, FIG. 9: a bottom view of parts of the base body with the metallic conductive structure in the region of a radiator.

The metallic conductive structure 18 is applied directly to the base body 16, for example by printing techniques, plating on plastic techniques (POP) or laser direct structuring techniques (LDS). The metallic conductive structure 18 and the base body 16 thus form a single piece as well as can be seen in FIG. 3. In particular, the metallic conductive structure 18 is not a separate component by itself as its structural integrity stems from the base body 16.

Figure 4:
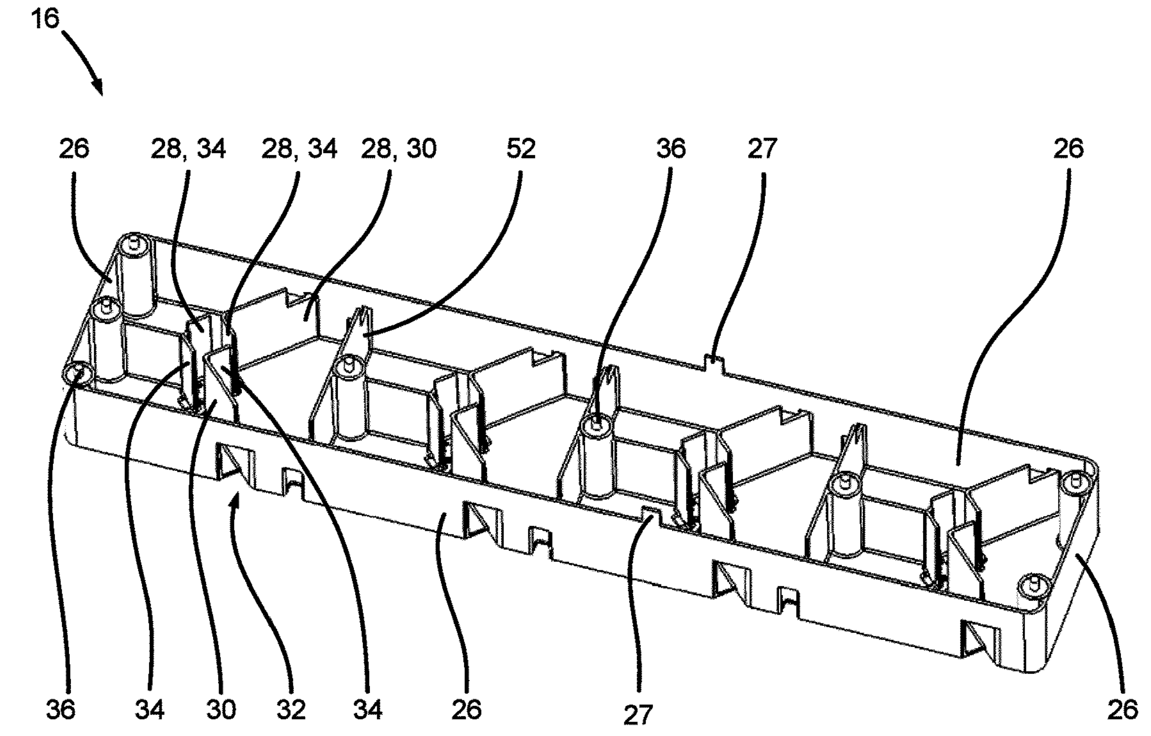

FIG. 4 shows the base body 16 without the applied metallic conductive structure 18.

The base body 16 comprises a cover portion 22 and walls 24 extending from the cover portion in an angle larger than zero, in the shown embodiment at an angle of 90°. In the shown embodiment, all walls 24 extend in the same direction.

The radiators 20 are thus arranged on the surface of the base body 16 facing away from and/or to the walls 24.

The walls 24 comprise sidewalls 26, which are provided at the edge of the cover portion 22. In the shown embodiment, four sidewalls 26 are present, surrounding the cover portion 22 around its full periphery.

The sidewalls 26 and the cover portion 22 can be seen as a housing which is open to one side having an inner volume. The sidewalls 26 therefore have an inner surface and an outer surface.

Two of the sidewalls 26 comprise flaps 27 extending further away from the cover portion 22. In the shown embodiment, the two longer ones of the sidewalls 26 comprise the flaps 27, wherein the flaps 27 are opposite one another.

The walls 24 also comprise interior walls 28 which extend in the space between the sidewalls 26, thus in the interior volume.

For each radiator 20, the arrangement of interior walls 28 is identical so that the arrangement for only one radiator 20 is explained in the following.

Two of the interior walls 28 extend from opposite sidewalls 26 towards the region of the center C of the respective radiator 20. These interior walls 28 are called feeding walls 30 in the following.

For example, the feeding walls 30 extends in an angle greater than zero and smaller than 90°, in particular between 10° and 80° from the corresponding the sidewall 26.

At the connection between each of the feeding walls 30 and the respective sidewall 26, the sidewall 26 has an opening 32, wherein the feeding wall 30 extends from the lateral edge of the opening 32. One of the surfaces of the feeding wall 30 thus merges with the outer surface of the sidewall 26 and the other one of the surfaces of the feeding wall 30 merges with the inner surface of the sidewall 26.

The height of the feeding walls 30, i.e. the difference in distance between the cover portion 22 and the end face of the respective wall facing away from the cover portion 22, is smaller than the height of the sidewall 26 at the connection between the feeding wall 30 with the respective sidewall 26.

Of course, the height of the feeding wall 30 may be the same as the height of the sidewalls 26 further away from the sidewall 26.

Four of the interior walls 28, called radiator walls 34 in the following, are arranged around the center C of the respective radiator 20, in particular on the four sides of an imaginary square centered around center C. These radiator walls 34 are thus arranged in the region of the radiator 20.

Two of the radiator walls 34 are connected to one of the feeding walls 30 each and are not connected to any of the other radiator walls 34.

The other two of the four radiator walls 34 may be connected to one another and, in the shown embodiment, these two radiator walls 34 may be stabilized by another interior wall 28.

Each of the walls 24 has two surfaces, namely a first surface and a second surface opposite the first surface. In the shown embodiment, the first surface of the sidewalls 26 is the surface facing towards the cover portion 22, i.e. the inner surface. The second surface of the sidewalls 26 is the surface facing away from the cover portion 22, i.e. the outer surface.

Likewise, the surfaces of the interior walls 28 can be grouped into first surfaces and second surfaces. The first surfaces of interior walls 28 merge with others first surfaces of sidewalls 26 or of other interior walls 28.

For example, at the connection between the feeding walls 30 with the respective sidewall 26, the surface of the feeding wall 30 merging with the second surface of the sidewall 26 through the opening 32 is also a second surface. Likewise, the surface of the feeding wall 30 merging with the first surface of the sidewall 26 on the inner side is also the first surface.

The same principle applies to connections between interior walls 28, for example between the feeding walls 30 and the radiator walls 34.

Further, in the shown embodiment, the base body 16 comprises a fixation element 36 extending away from the cover portion 22. For example, the fixation element 36 is provided on a wall 24 and extends to the outside of the interior volume.

The fixation element 36 may be a hot melting button or a metallized pin.

The conductive structure 18 comprises the radiators 20, a feeding portion 38 and a ground portion 40.

Figure 5:
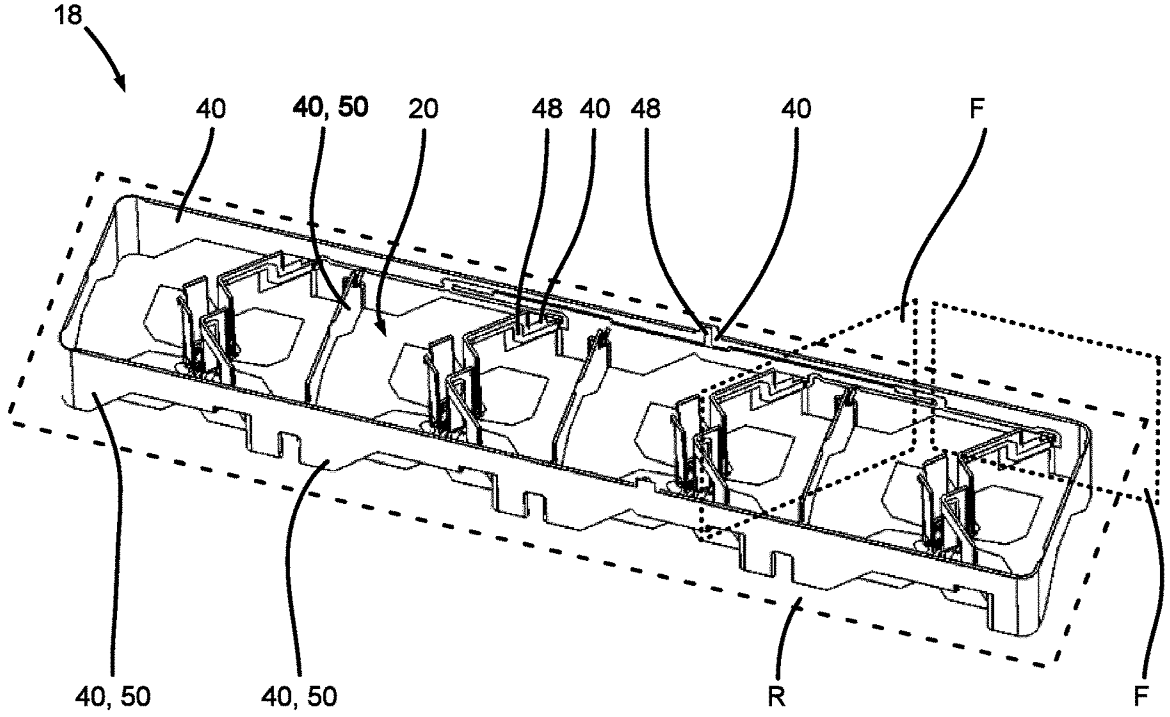
Figure 6:
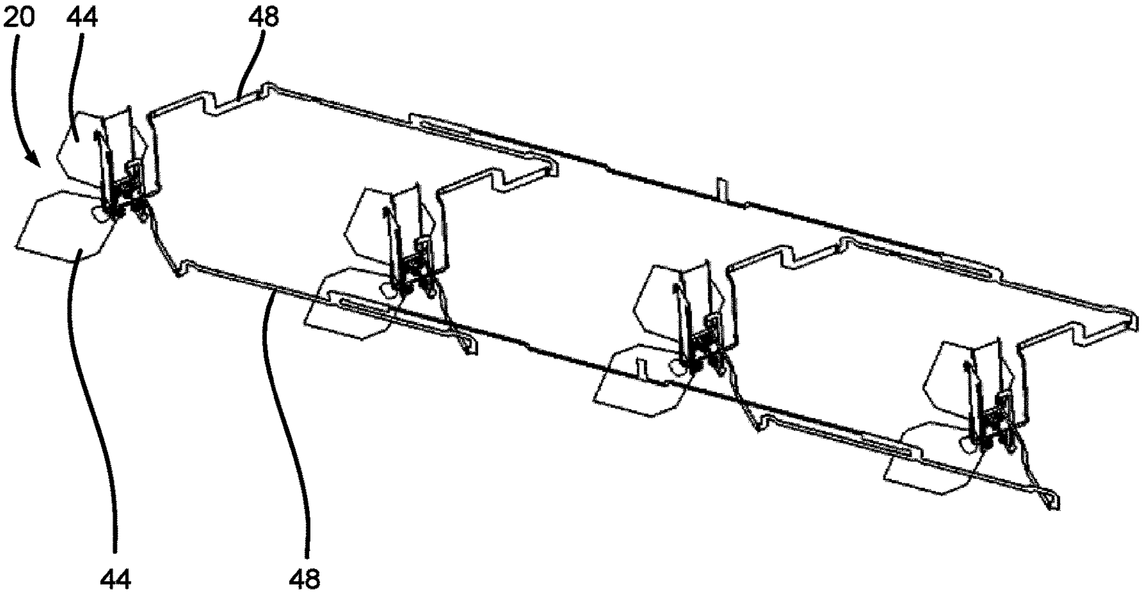
Figure 7:
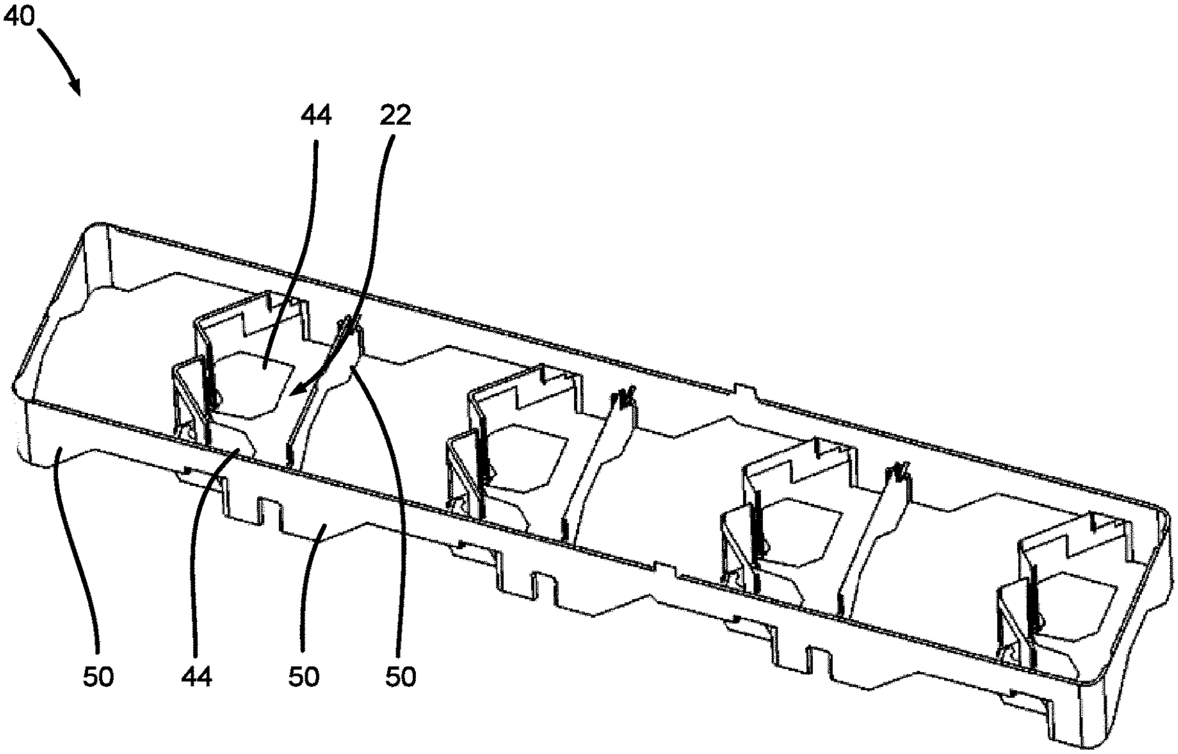

FIG. 5 shows the whole conductive structure 18 without the base body 16. FIG. 6 shows only the feeding portion 38 and FIG. 7 shows only the ground portion 40. Again, as mentioned before, the conductive structure 18 does not exist as part separate from the base body 16 so that FIGS. 5 to 7 are simplifications for illustrative purposes.

The radiators 20 are dual polarized radiators each having four radiation surfaces 44 arranged around the center C. The outer contour or envelope of each radiator 20 is a rectangle, in particular a square, divided into four quadrants.

Figure 8:
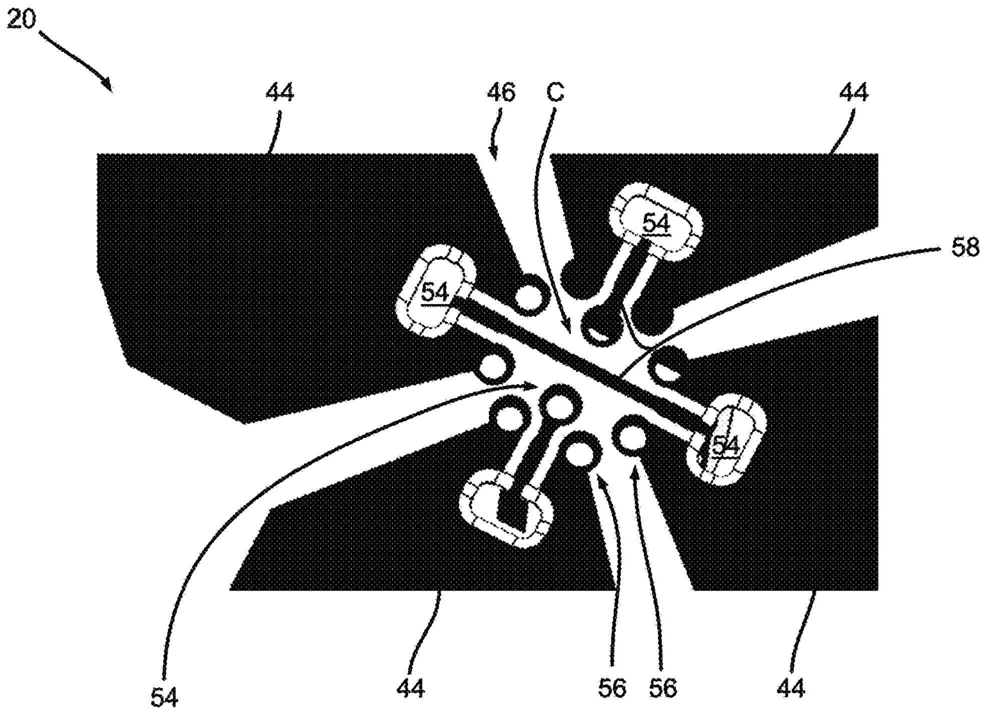

Each one of the radiation surfaces 44 is located in one of the quadrants, wherein the radiation surfaces 44 are spaced apart by slits 46, as can be seen in FIG. 8 shown an enlargement of the center region of one of the radiators 20.

The two radiation surfaces 44 diametrically opposed form a pair for one of the two polarizations. The polarization planes thus extent diagonally in the contour of the radiator 20 and perpendicular to the radiator plane R.

The feeding walls 30 are aligned such that they do not run parallel to the slits 46 and run preferably parallel to or in one of the polarization planes.

The feeding portion 38 and the ground portion 40 of the conductive structure 18 provide the signal to the radiators 20 or the grounding for the radiators 20, respectively, during operation.

The feeding portion 38 comprises a plurality of feeding lines 48 being located mostly, in particular by more than 80% on surfaces of the walls 24.

The ground portion 40 is also located mostly, in particular by more than 80% on surfaces of the walls 24, however on opposite surfaces than the feeding lines 48.

More specifically, the feeding lines 48 run mostly, in particular by more than 80% on the first surfaces of the walls 24 and the ground portion 40 extends mostly, in particular by more than 80% on the second surfaces of the walls 24.

The feeding lines 48 are thus provided mainly, in particular fully within the interior volume.

The feeding lines 48 and the ground portion 40 are designed such that for each section of a feeding line 48 on a first surface of a wall 24, a section of the ground portion 40 is provided directly opposite on the second surface of the same wall 24.

In other words, for any of the walls 24, if an area on the first surface is provided with a feeding line 48, the corresponding area on the second surface is provided with parts of the ground portion 40. This can be seen by a comparison of FIGS. 5 to 7.

Thus, for each feeding line 48, a part of the ground portion 40 is provided serving as a ground plane so that the feeding line 48 and the ground portion 40 form microstrip lines on the walls 24.

The feeding lines 48 and thus the microstrip lines run mostly, in particular by more than 80% in various planes, called feeding planes F in the following. Each of the feeding planes F has an angle larger than 0°, in particular is perpendicular to the radiator plane R.

For each polarity of the radiators 20, a separate set of feeding lines 48 and thus a separate set of microstrip lines is provided to provide different signals for the different polarities as it is known in the art.

In the shown embodiment, two sets of feeding lines 48 are present, which extended on either one of the larger sidewall 26 and are symmetric with respect to the center plane of the antenna 10. Thus, only one of the sets of feeding lines 48 is described in the following.

The feeding lines 48 and with that the microstrip lines start on one of the flaps 27 and then fork once or multiple times to have parallel single feeding lines 48 for feeding each radiator 20.

In the shown embodiment, the feeding lines 48 fork twice on the sidewall 26 so that four single feeding lines 48, each for one of the radiators 20, are provided.

Figure 9:
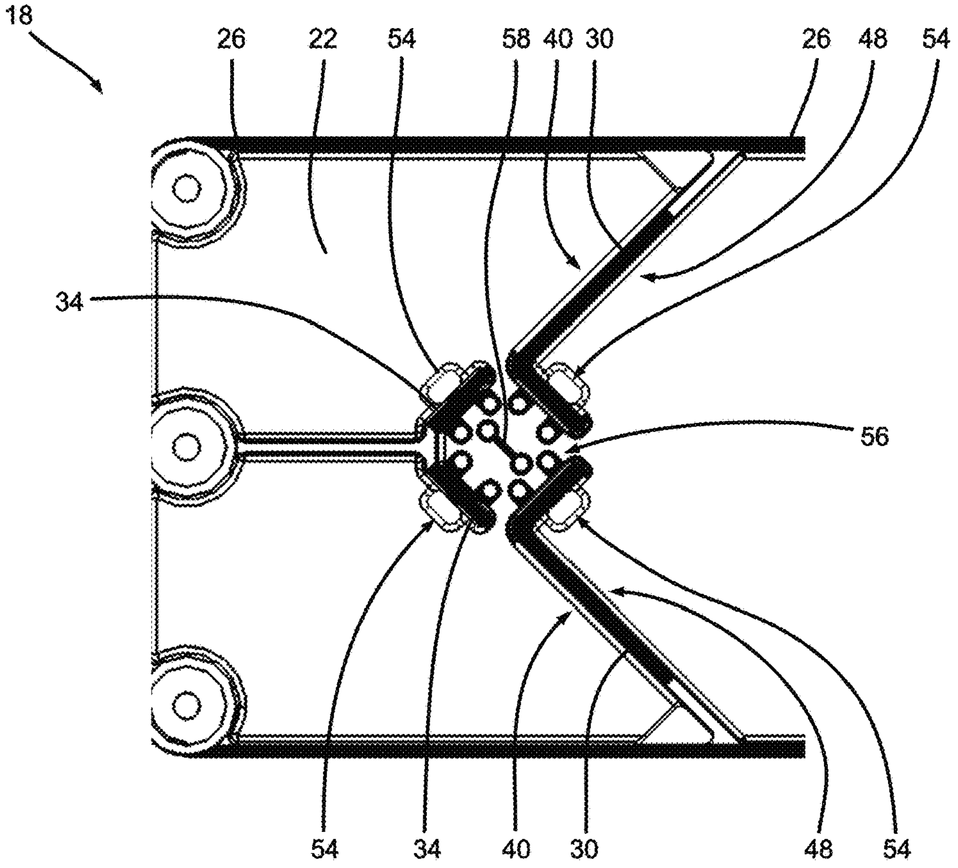
Figure 10:
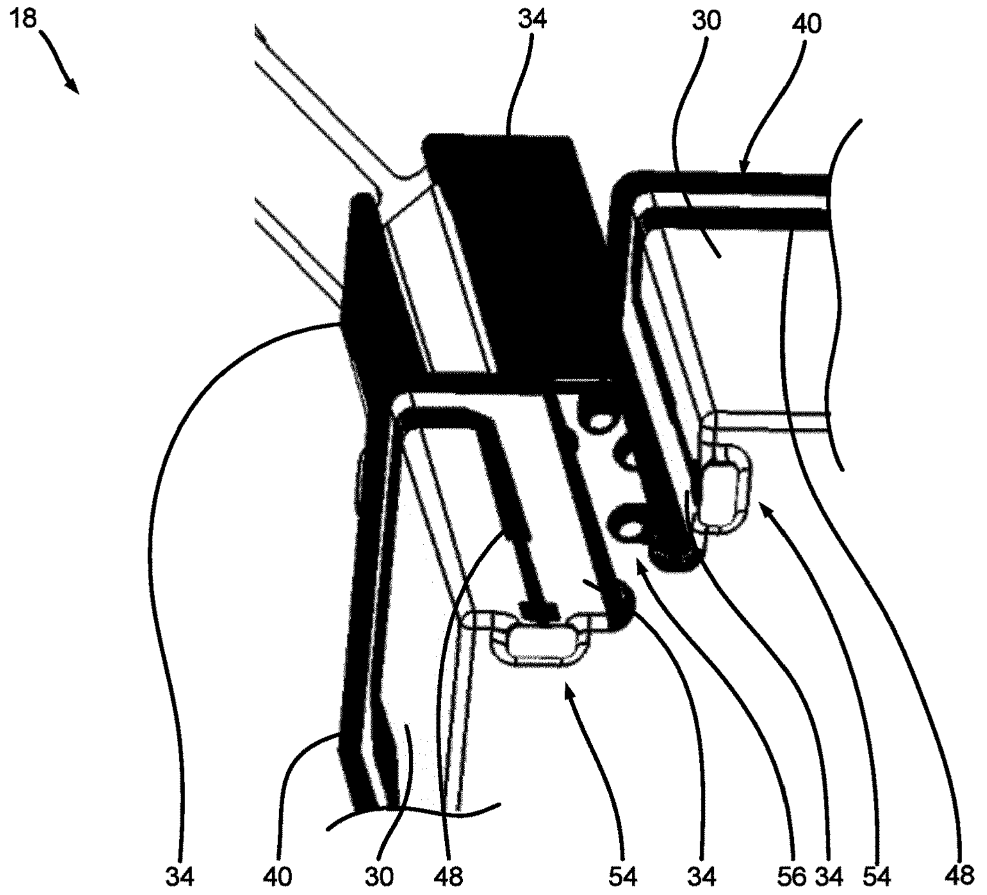
FIGS. 10, 11: different perspective views of the region shown in FIG. 9, FIG. 12: an antenna array according to the invention having multiple antennas according to FIG. 1, FIG. 13: schematically a mobile communication base station according to the invention.
Figure 11:
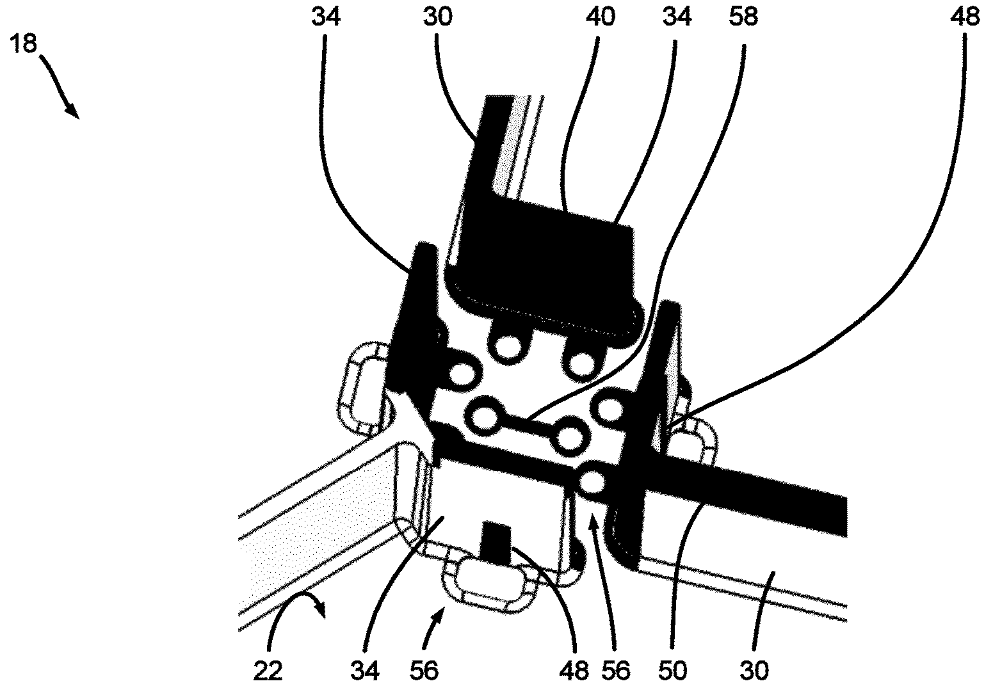

From the sidewall 26, each of the feeding lines 48 runs along one of the feeding walls 30 to the corresponding radiator wall 34. As can be seen in FIGS. 9 and 10 which shows an enlarged view of the region of the radiator 20, the feeding lines 48 run on the radiator wall 34 towards the cover portion 22.

In order to contact the radiator 20 on the other side of the cover portion 22, the cover portion 22 comprises a plurality of holes 54, 56 as can be seen in FIGS. 8 to 11.

The holes 54, 56 are associated with one of the radiator walls 34, wherein one radiator wall 34 may have a plurality of associated holes 54, 56. The holes 54, 56 are aligned with one of the surfaces of the associated radiator wall 34. The holes 54 aligned with the first surface are called feeding holes 54 in the following, and the holes 56 aligned with the second surface are called grounding holes 56.

The feeding lines 48 extend through the respective feeding holes 54 and couple to the corresponding radiation surface 44. Likewise, parts of the ground portion 40 extend through the grounding holes 56, providing grounding for the corresponding radiation surface 44.

The feeding holes 54 and the grounding holes 56 provide feeding points and grounding points, respectively, for the radiation surfaces 44. As can be seen in FIG. 8, the feeding points are all located at the side of the radiation surfaces 44 facing the center C. The other sides of the radiation surfaces 44 free from feeding or grounding points.

Further, bridging lines 58 of the conductive structure 18 are provided on either side of the cover portion 22 each one provided to couple the two radiation surfaces 44 of one of the polarities of the radiator 20.

Open end feeding lines 48 are provided on the two radiator wall 34 not in contact with a feeding wall 30. These open end feeding lines 48 also extend through the corresponding feeding hole 54 and are connected to the respective one of the bridging lines 58. The open end feeding lines 48 extend away from the cover portion 22 and terminate on the radiator wall 34, for example at half the height of the radiator wall 34.

This way, each radiator 20 is connected via a microstrip type line with the flap 27, which serves as contacting points.

Apart from providing the ground plane for the feeding lines 48, the ground portion 40 comprises other parts, for example shielding segments 50.

The shielding segments 50 are located on the outside of the sidewalls 26 and on separation walls 52 between each radiator 20. In particular, shielding segments 50 extent along the full periphery of the base body 16. The shielding segments 50 reduce crosstalk between the radiators 20 and improve the beam shape of the radiators 20.

The ground portion 40 may also comprise segments on the faces of the walls 24 facing the reflector plate 14 for galvanically and/or capacitively contacting the reflector plate 14.

Going back to FIG. 1, it can be seen that the reflector plate 14 attached to the base body 16 not only functions as the reflector for the radiators 20 but also providing shielding for the feeding lines 48 inside the inner volume. The inner volume is thus defined by the cover portion 22, the sidewalls 26 and the reflector plate 14.

For this purpose, the reflector plate 14 is a metal sheet, e.g. a single piece of aluminum, or is made of metallized PCB. As explained above, grounding of the reflector plate 14 is provided by the ground portion 40.

Furthermore, it is possible that the reflector plate 14 is made of PCB or MID and compromises at least one waveguide, consisting of a signal layer and a ground layer. In this case, the ground layer of the waveguide, preferably the ground layer of a microstripline, would face towards the base body, providing the shielding functionality and the reflector functionality for the radiators 20.

Further, the feeding module 12 is attached to the reflector plate 14 on the side of the reflector plate 14 facing away from the base body 16.

The feeding module 12 may comprise a feeding circuit or structure (not shown), for example at least one phase shifter, and a signal port 60 of the antenna 10. The feeding circuit or structure and/or the port 60 are connected to the feeding lines 48 on the flip 27 in order to connect the radiators 20 with the feeding circuit or structure and/or the port 60.

The feeding module 12 may be a molded interconnected device (MID) with the feeding circuit or structure directly applied to a base material.

Fixation of the reflector plate 14 and/or the feeding module 12 may be provided by the fixation elements 36 of the base body 16. In this case, the fixation elements 36 extend through corresponding holes in the reflector plate 14 and in the feeding module 12. The fixation elements 36 are deformed on the side facing away from the base body of the reflector plate 14 or the feeding module 12 to lock the reflector plate 14 and/or the feeding module 12 in place. Of course, the fixation elements 36 may also be bonded to the reflector plate 14 or the feeding module 12.

Further, the flaps 27 of the sidewalls 26 as well as the feeding lines 48 and the ground portion 40 on the flaps 27 extend through the reflector plate 14 and at least partly into the feeding module 12.

Figure 12:
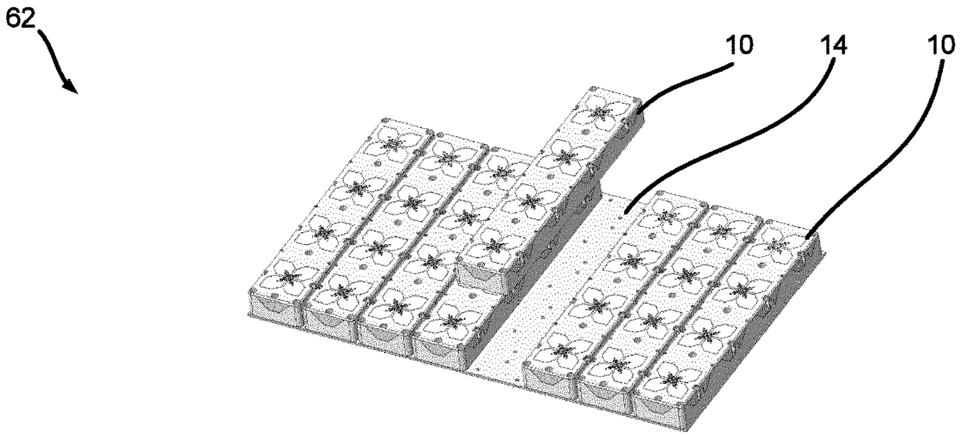

The antenna 10 may be used in an antenna array 62 as shown in FIG. 12. The antenna array 62 comprises a plurality of antennas 10 which are aligned side-by-side with the long sidewalls 26 adjacent each other.

In the shown embodiment of the antenna array 62, the base bodies 16 are mounted on a common reflector plate 14 for all of the antennas 10.

Figure 13:
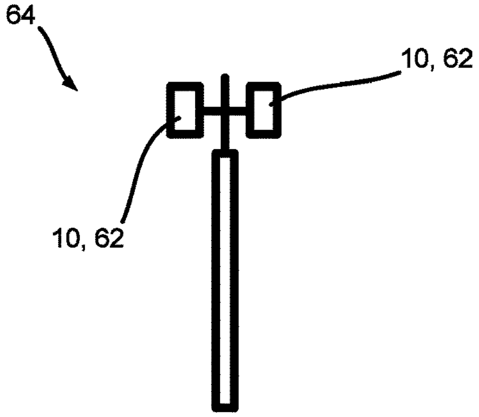

The antenna array 62 or a single antenna 10 can then be used in a mobile communication base station 64 as shown in FIG. 13.

With the use of the antenna 10 as discussed above, it is possible to provide a single piece antenna 10 at very low costs as the single piece base body 16 with the applied conductive structure 18 can be manufactures at low costs.

Interference between the feeding lines 48 and the radiators 20—and with that the signals emitted and received from the radiators 20—is effectively avoided because the signal lines feeding the radiators 20 are located in the feeding planes F angled or perpendicular to the radiator plane R.

Furthermore, by complementing each feeding line 48 with a part of the ground portion 40, microstrip lines can be provided at the side walls further reducing complexity.

In addition, the feeding lines 48 in the interior volume are shielded effectively from interferences, further increasing signal quality.

It is of course possible that the antenna 10 comprises only two or three or even more than four radiators 20.

It is also possible that the antenna 10 does not comprise a feeding module 12. In this case, feeding cables and ground cables are attached, e.g. soldered, to the feeding lines 48 and ground portion 40 on the flaps 27, respectively.

Figure 14:
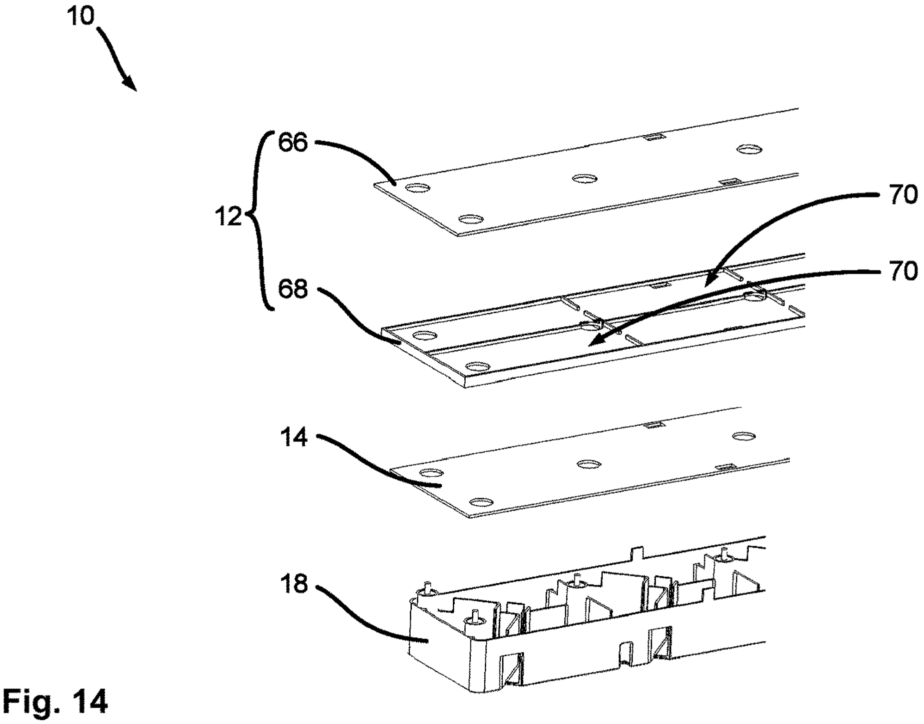
FIG. 14: an exploded view of an antenna according to a second embodiment of the invention.

FIG. 14 shows a second embodiment of an antenna according to the invention. The second embodiment corresponds substantially to the first embodiment discussed above, so that only the differences are discussed in the following. The same and functionally the same parts are labeled with the same reference signs.

In the second embodiment, the feeding module 12 comprises a conductive cover 66 and a signal carrier 68.

The signal carrier 68 comprises the feeding circuit or structure and the port 60.

The signal carrier 68 provides beside the signal line part of at least one waveguide one or more cavities 70 on both sides. Together with the conductive cover 66 and the reflector plate 14 the carrier 68 is forming an air cavity waveguide.

To this end, the signal carrier 68 may also be an MID. The conductive cover 66 and the reflector plate 14 may be made of a single electrically conductive piece or of a plurality of electrically conductive pieces.

Those two parts 66, 14 are preferably metal sheets but could be also metal layers of printed circuit boards or additional base bodies with metallic conductive structure applied, e.g. in an electroplating process and/or electroless plating process.

The fixation element 36 from the base body 16 with a metallic conductive structure 18 is preferably galvanically connected or electromagnetically coupled with the conductive cover 66 and/or the reflector plate 14 or the signal carrier 68. Preferably, the fixation element 36 and signal carrier 68 are connected galvanically or coupled electromagnetically; the fixation element 36, the conductive cover 66 and the reflector plate 14 are coupled electromagnetically, more preferably coupled capacitively.

It is also conceivable that the fixation element 36 is passing the conductive cover 66 and the reflector plate 14 and that the signal carrier 68 has no galvanic connection or electromagnetic coupling, functioning as mechanical fixation only without providing at least one electrical grounding.

The number of connections and type of connection between the fixation element 36 and other parts is for example depending on the grounding concept, costs and signal integrity quality requirements.

It is also possible that the signal carrier 68 compromises a complete waveguide structure, e.g. the signal line and ground portion that are forming a microstripline. In case of having a ground layer and signal layer only on the signal carrier 68, the cavities 70, the conductive cover 66 and/or the reflector plate 14 can be omitted and the carrier 68 is directly attached to base body 16 to the metallic conductive structure 18. This arrangement is lower cost, due to less parts, but higher transmission line loss, e.g. due to microstripline instead of air cavity stripline.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. An antenna, comprising a base body and a metallic conductive structure applied to the base body, wherein the base body comprises a flat cover portion and an interior wall extending in an angle with respect to sidewalls of the antenna, away from the cover portion, wherein the conductive structure comprises at least one radiator provided at the cover portion, at least one feeding line for the at least one radiator and at least one ground portion, wherein the feeding line and the ground portion are provided at at least one of the walls, wherein the radiator defines a radiator plane (R) and the feeding lines extend in at least one feeding plane (F) coplanar with the interior wall, wherein the at least one feeding plane (F) is arranged in an angle to the radiator plane (R).

2. The antenna according to claim 1, characterized in that the walls comprise a first surface and an opposite second surface, wherein the feeding line is located on the first surface and the ground portion is provided on the second surface.

3. The antenna according to claim 1, characterized in that the at least one feeding line and the corresponding section of the ground portion together form at least one microstrip line supported by the walls.

4. The antenna according to claim 1, characterized in that the radiator is provided on the surface of the cover portion facing away from the walls and/or on the surface of the cover portion facing to the walls.

5. The antenna according to claim 1, characterized in that the walls include at least one sidewall extending from the cover portion at the periphery of the cover portion, wherein the surface of the sidewall facing towards the cover portion is the first surface and the surface of the sidewall facing away from the cover portion is the second surface.

6. The antenna according to claim 5, characterized in that at least one of the interior walls is connected to one of the sidewalls, wherein the height of the interior wall at the connection to the sidewall is smaller than the height of the sidewall and/or wherein the sidewall has an opening such that the second surface of the interior wall merges into the second surface of the sidewall.

7. The antenna according to claim 6, characterized in that the interior wall and the corresponding sidewall enclose an angle between 10° and 80° between each other.

8. The antenna according to claim 1, characterized in that the walls include interior walls extending at least in parts from the cover portion in the region of one of the at least one radiator.

9. The antenna according to claim 8, characterized in that the cover portion comprises holes associated with one of the interior walls, wherein one of the holes is aligned with one surface of the associated wall and another one of the holes is aligned with the other one of the surfaces of the associated interior wall.

10. The antenna according to claim 1, characterized in that the radiator is a dual polarized radiator comprising four radiation surfaces.

11. The antenna according to claim 10, characterized in that each radiation surface comprises a feeding point and/or a grounding point.

12. The antenna according to claim 1, characterized in that the antenna comprises a reflector plate extending in a plane parallel to the radiator plane (R), wherein the reflector plate is attached to the walls on the side facing away from the cover portion, wherein the reflector plate is in contact with the ground portion of the conductive structure.

13. The antenna according to claim 12, characterized in that at least one fixation element of either a hot melting button or a metallized pin, is provided at the base body, the fixation element extending through corresponding holes in the reflector plate for attaching the reflector plate to the base body.

14. The antenna according to claim 1, characterized in that the antenna comprises a feeding module being arranged on the side of the reflector plate facing away from the base body.

15. The antenna according to claim 14, characterized in that the feeding module comprises at least one feeding circuit or structure.

16. The antenna according to claim 1, characterized in that a sidewall comprises a flap extending away from the cover portion, wherein a part of the feeding line extends on the first surface of the flap and/or wherein the ground portion extends on the second side of the flap.

17. The antenna according to claim 1, characterized in that the base body and the conductive structure form a molded interconnect device, and/or wherein the metallic conductive structure has been metallized directly onto the base body.

18. The antenna according to claim 1, characterized in that the antenna comprises two, three, four or more radiators, wherein at least one feeding line for each radiator is provided, the feeding lines for the same polarization but different radiators being galvanically connected to each other.

19. The antenna of claim 1, wherein the angle of the interior wall with respect to the sidewalls of the antenna is perpendicular, and the angle of the one feeding plane (F) with respect to the radiator plane (R) is perpendicular.

20. An antenna array comprising at least two antennas, and a common reflector plate serving as the reflector plate for each of the antennas, wherein at least one of the at least two antennas comprises a base body and a metallic conductive structure applied to the base body, wherein the base body comprises a flat cover portion and an interior wall extending in an angle with respect to sidewalls of the antenna, away from the cover portion, wherein the conductive structure comprises at least one radiator provided at the cover portion, at least one feeding line for the at least one radiator and at least one ground portion, wherein the feeding line and the ground portion are provided at least one of the walls, wherein the radiator defines a radiator plane (R) and the feeding lines extend in at least one feeding plane (F) coplanar with the interior wall, wherein the at least one feeding plane (F) is arranged in an angle to the radiator plane (R).

21. A mobile communication base station having an antenna comprising a base body and a metallic conductive structure applied to the base body, wherein the base body comprises a flat cover portion and an interior wall extending in an angle with respect to sidewalls of the antenna, away from the cover portion, wherein the conductive structure comprises at least one radiator provided at the cover portion, at least one feeding line for the at least one radiator and at least one ground portion, wherein the feeding line and the ground portion are provided at least one of the walls, wherein the radiator defines a radiator plane (R) and the feeding lines extend in at least one feeding plane (F)

coplanar with the interior wall, wherein the at least one feeding plane (F) is arranged in an angle to the radiator plane (R).

* * * * *